(12) United States Patent
Haseltine

(10) Patent No.: US 11,092,462 B1
(45) Date of Patent: Aug. 17, 2021

(54) SYSTEMS AND METHODS FOR THROUGH WALL LOCATING

(71) Applicant: Eric Haseltine, Rancho Palos Verdes, CA (US)

(72) Inventor: Eric Haseltine, Rancho Palos Verdes, CA (US)

(73) Assignee: Eric Haseltine, Rancho Palos Verdes, CA (US)

( * ) Notice: Subject to any disclaimer, the term of this patent is extended or adjusted under 35 U.S.C. 154(b) by 0 days.

(21) Appl. No.: 17/156,096

(22) Filed: Jan. 22, 2021

(51) Int. Cl.
G01D 5/20 (2006.01)

(52) U.S. Cl.
CPC ..................... *G01D 5/20* (2013.01)

(58) Field of Classification Search
CPC ....................................................... G01D 5/20
See application file for complete search history.

(56) References Cited

U.S. PATENT DOCUMENTS

| 3,916,301 A | | 10/1975 | Vild et al. | |
|---|---|---|---|---|
| 4,845,433 A | * | 7/1989 | Kleinberg | G01V 3/28 324/338 |
| 4,901,023 A | * | 2/1990 | Vail, III | G01V 3/28 324/339 |
| 5,657,026 A | * | 8/1997 | Culpepper | H01Q 1/3275 342/101 |
| 7,750,841 B2 | * | 7/2010 | Oswald | G01S 5/04 342/147 |
| 8,779,877 B2 | | 7/2014 | Fullerton et al. | |
| 9,929,597 B2 | | 3/2018 | Jaskolski et al. | |
| 10,739,488 B2 | | 8/2020 | Takahashi et al. | |
| 2004/0203361 A1 | * | 10/2004 | Belcher | G01V 15/00 455/41.2 |
| 2008/0070499 A1 | | 3/2008 | Wilhelm et al. | |
| 2011/0163740 A1 | | 7/2011 | Russell et al. | |
| 2011/0295507 A1 | * | 12/2011 | Lu | G01V 3/12 702/6 |

(Continued)

OTHER PUBLICATIONS

Hassan et al., "Wireless Power Transfer Through Metallic Barriers Enclosing a Harsh Environment; Feasibility and Preliminary Results," IEEE International Symposium on Circuits and Systems (ISCAS), pp. 2391-2394, IEEE, Embry-Riddle Aeronautical University, May 2016.

(Continued)

*Primary Examiner* — Akm Zakaria
(74) *Attorney, Agent, or Firm* — Myers Wolin, LLC (57) ABSTRACT

A transmitter unit is provided for transmitting a continuous waveform in a magnetic field, the continuous waveform being an unmodulated electromagnetic waveform. The transmitter unit typically comprises a transmitting solenoid for transmitting the continuous waveform, and an oscillator for generating the continuous waveform. A receiver unit is also provided, the receiver unit having receiving circuitry, such as a receiving solenoid, for receiving the continuous waveform. The receiver unit also provides an output for outputting an indication of proximity between the transmitter unit and the receiver unit, where a characteristic of the indication of proximity depends on the strength of the magnetic field generated by the transmitter unit at the location of the receiving solenoid. Also provided is a method for using a system having a transmitter unit and a receiver unit.

15 Claims, 6 Drawing Sheets

(56) References Cited

U.S. PATENT DOCUMENTS

2012/0071094 A1    3/2012  Hyland et al.
2012/0286785 A1*  11/2012  Besio ................. G01R 33/3873
                                                           324/318
2014/0091802 A1*   4/2014  Yang ...................... G01R 33/60
                                                           324/322

OTHER PUBLICATIONS

Moss et al., "Detachable acoustic electric feedthrough," Proceedings vol. 7647, pp. 1-12, Sensors and Smart Structures Technologies for Civil, Mechanical, and Aerospace Systems 2010; 764745, Apr. 1, 2010.

* cited by examiner

SYSTEMS AND METHODS FOR THROUGH WALL LOCATING

FIELD OF THE INVENTION

Systems and methods are described for precisely locating a position through a wall.

BACKGROUND

Serious accidents may occur when construction or repair workers cutting or drilling through walls, including metal walls, fail to properly locate a target cutting location. Such workers may penetrate into hazardous areas such as fuel tanks, fuel lines, or electrical lines located on an opposite side of a wall they are cutting or drilling.

Such accidents are a common source of fires, for instance, in the ship repair and building industry where cutting torches applied from one side of a metal partition may inadvertently cut into hazardous areas on the opposite unseen side of the partition (such as a marine bulkhead). Systems and methods for precisely locating a safe place to cut so that damage is avoided on the opposite side of a partition have not previously been adequately developed due to problems with existing locating technologies.

Currently, workers often attempt to make precise measurements on both sides of the construction wall so that corresponding points on opposite sides of the wall are accurately located independently. Another common approach is to "tap" or use other acoustic energy (i.e., tones) and to have workers attempt to locate the source of the energy on the opposite side of the wall. These attempts are typically imprecise and unreliable.

Such problems are exacerbated when dealing with metal partitions or walls, and include difficulty with locating sounds or other types of energy through thick metal, such as structural plate steel. For instance, plate steel used in marine bulkheads dissipates acoustic energy from sharp taps or other sources so that precise location of corresponding points on opposite sides of walls are difficult.

In addition to the difficulty in locating hazards on opposite sides of walls, similar challenges exist in defining highly precise fiducial points from which to make measurements. Such marking is often impractical in many construction and repair settings.

Other existing approaches are to use permanent magnets to mark a location on one side of a wall, such that a magnetometer placed on the opposite side of the wall can detect the magnet's location. However, the high magnetic permeability of ferrous substances, such as structural steel, also tends to absorb, or shunt, magnetic fields, thereby attenuating and diffusing magnetic fields. This makes precise location difficult, even when using strong permanent magnets.

There is a need for systems and methods for the precise location of hazards on one side of a wall to be clearly revealed on the other side of that wall, so that workers can safely penetrate the wall surface. There is a further need for systems and methods for precisely locating fiducial points that can be used as references.

SUMMARY

The current disclosure provides systems and methods for overcoming limitations of previous approaches by employing a transmit/receiver pair that radiate and receive a series of strong, time varying electromagnetic pulses that can be used to precisely locate corresponding points on opposite sides of a wall.

Electromagnetic pulses produced on one side of a wall, emanating from a transmit coil create a sharp magnetic field gradient, resulting in a steeply sloping magnetic field, on the opposite side of the wall. A receiver with a sensitive pick-up coil can then discriminate small differences in magnetic field strength in order to locate the spot of peak magnetic strength indicating the position nearest the transmit coil on the opposite side of a wall.

The use of time varying magnetic pulses allows for optimizing a frequency of oscillations to maximize electromagnetic transmission through a metal wall. The pulses may be shaped and adjusted to further make those pulses easily audible to the human ear, once amplified. Such an approach allows for precise localization on opposite sides of a wall. Some embodiments may thereby produce localizations within an accuracy of 1-3 mm.

In some embodiments, the transmitter and receiver each include solenoid coils, and when a location is properly located, both solenoids are aligned with each other axially. In such an embodiment, slight variations in the position of the receiver coil with respect to the transmitter coil would produce large variations in signal strength, thereby achieving better accuracy.

In some embodiments, a transmitter unit is provided for transmitting a continuous waveform in a magnetic field, the continuous waveform being an unmodulated electromagnetic waveform. The transmitter unit typically comprises a transmitting solenoid for transmitting the continuous waveform, and an oscillator for generating the continuous waveform.

A receiver unit is also provided, the receiver unit having receiving circuitry, such as a receiving solenoid, for receiving the continuous waveform. The receiver unit also provides an output for outputting an indication of proximity between the transmitter unit and the receiver unit, where a characteristic of the indication of proximity depends on the strength of the magnetic field generated by the transmitter unit at the location of the receiving solenoid.

The receiver unit may further comprise an amplifier for amplifying the continuous waveform received at the receiving solenoid in proportion with an intensity of the waveform received at the receiving solenoid.

Typically, the transmitting and receiving solenoids are oriented perpendicular to a wall through which a location is being located during use. The receiving solenoid may be selected to be in resonance with the transmitting solenoid at a frequency of the continuous waveform.

In some embodiments, both the transmitting and receiving solenoids are selected, along with corresponding capacitors, to be in resonance at the frequency of the continuous waveform, thereby increasing the strength of the magnetic field at the location of the receiving solenoid by way of resonant inductive coupling when the solenoids are substantially axially aligned.

In some embodiments, the continuous waveform is an ultra-low frequency or lower frequency waveform. In some embodiments, the waveform may be below 10 Hz, or at approximately 5 Hz. In some embodiments, the waveform is a square waveform.

In some embodiments, the output is an audio amplifier for amplifying the continuous waveform proportionally to the magnetic field strength at the receiving circuitry, such as the receiving solenoid, and outputting the amplified continuous waveform as audio. The characteristic of the indication of the proximity that at least partially depends on magnetic field strength may then be volume, frequency, sharpness, or pitch of the audio output. In some such embodiments, the continuous waveform may be a square waveform, and the volume and sharpness of the audio output may then vary based on location of the receiving circuitry.

In some embodiments, the transmitter unit may further comprise a permanent magnet for fixing the transmitter unit to a wall through which the system is being used to locate.

Also provided is a method for through wall locating. Such a method may comprise locating a transmitter unit adjacent a desired location on a first side of a wall, and transmitting a continuous electromagnetic waveform from the transmitter unit.

A user then locates a receiver unit adjacent the wall opposite the transmitter unit, where the receiver unit includes receiving circuitry and an output for outputting an indication of proximity.

The receiving circuitry then receives the continuous electromagnetic waveform output by the transmitter unit and generates an indication of proximity based at least partially on the strength of the magnetic field generated by the transmitter unit at the receiving circuitry.

The receiver unit continuously outputs the indication of proximity at the output while a user moves the receiver unit along the wall.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 1:
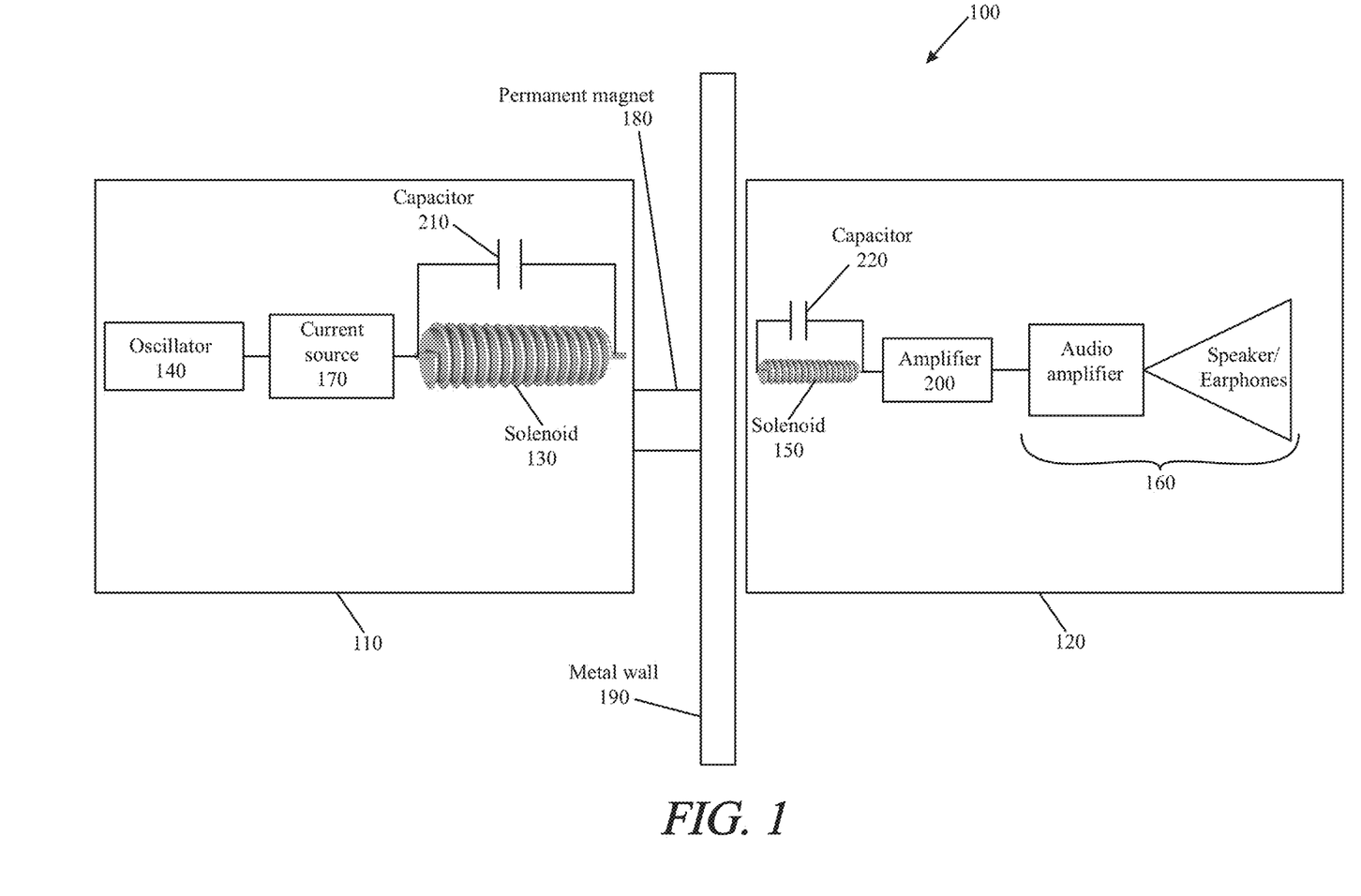
FIG. 1 shows an embodiment of a system in accordance with this disclosure.

FIG. 1 shows an embodiment of a system 100 in accordance with this disclosure. As shown, the system 100 includes a transmitter unit 110 and a receiver unit 120.

The transmitter unit 110 typically transmits a continuous waveform as a magnetic field. The waveform may be transmitted by a transmitting solenoid 130 contained within the transmitter unit 110. The transmitter unit 110 may further comprise a harmonic oscillator 140 for generating the continuous waveform to be transmitted and providing it to the transmitting solenoid 130 for transmission.

The receiver unit 120 may then comprise receiving circuitry, typically including a receiving solenoid 150, which receives the continuous waveform transmitted by the transmitter unit 110. The receiving solenoid 150 receives the continuous waveform through induction and generates a voltage from the magnetic field radiated by the transmitting solenoid 130.

The receiver unit 120 may further comprise an output 160 for outputting an indication of a proximity between the transmitter unit 110 and the receiver unit 120. The indication of proximity may include a characteristic depending on the strength of the magnetic field generated by the transmitter unit 110 at the location of the receiving solenoid 150.

The transmitter unit 110 may include a current source 170 or amplifier paired with the oscillator 140 in order to drive the transmitting solenoid 130 and output the continuous waveform. The current source 170 or amplifier would then amplify voltage and current supplied to the transmitting solenoid 130, such that the solenoid radiates an alternating current (AC) magnetic field. The continuous waveform is typically a periodic unmodulated electromagnetic waveform, such that the continuous waveform does not act as a carrier signal for carrying data. The waveform may be a square wave, and may be an ultra-low frequency or lower frequency waveform as discussed in more detail below. For example, the waveform may be a square waveform having a frequency of 5 Hz.

The transmitter unit 110 may further include a permanent magnet 180, which may be used to locate the transmitter unit adjacent a desired location on a first side of a wall 190.

The receiver unit 120 may include an amplifier 200, which may be a pre-amp, for amplifying the continuous waveform received from the transmitting solenoid 130 by way of the receiving solenoid 150. The amplifier 200 then amplifies the continuous waveform in proportion with an intensity of the waveform received at the receiving solenoid 150. The intensity of the waveform is a function of the strength of the magnetic field generated by the transmitter unit 110 at the location of the receiving solenoid 150.

As shown in FIG. 1, when in use, the transmitter unit 110 is located adjacent a desired location on a wall 190, where it may be fixed using a permanent magnet 180. For example, the wall may be structural steel or plate steel, or some other ferrous material, such that the permanent magnet may be used to fix the transmitter unit 110 for use in measurement. Typically, the desired location is either a specific location which the user would like to use as a fiducial point, such that an identical point opposite the wall should be identified, or the desired location is simply a location that is safe to cut or drill from the opposite side.

The receiver unit 120 may then be brought close to the wall 190 from the opposite side while the transmitter unit 110 is fixed by way of the permanent magnet 180, such that the continuous waveform output by the transmitting solenoid 130 of the transmitter unit is received at the receiving solenoid 150 of the receiver unit 120.

As discussed in more detail below, when the transmitter unit 110 and the receiver unit 120 are brought closer to each other through the wall 190 and are brought more closely into alignment, the magnetic field generated by the transmitter unit 110 at the location of the receiving circuitry 150 is increased. This is then reflected in the indication of proximity as a characteristic of that indication.

The amplifier 200 receives the continuous waveform from the receiving solenoid 150 as a voltage generated from the magnetic field and amplifies it in proportion with an intensity of the waveform received at the receiving solenoid. In some embodiments, the output 160 includes an audio amplifier which further amplifies the continuous waveform proportionally to the magnetic field strength at the receiving circuitry 150 and outputs the amplified continuous waveform as audio by way of speakers or earphones, where the characteristic of the indication of the proximity is volume, frequency, sharpness, or pitch of the audio output.

Accordingly, in the example of the square waveform above having a nominal frequency of 5 Hz, the square waveform would be received at the receiving solenoid 150, amplified by the amplifier 200 and then fed into an audio amplifier 160. The square waveform would then be output as audio proportional to the magnetic field strength associated with the square waveform at the receiving solenoid 150. As such, when output through a speaker or headphones, the user would hear a 5 Hz beating sound, similar to the thump of helicopter rotors.

Because the magnetic field strength would change when the receiver unit 120 is moved, the changing field strength would increase and decrease in intensity as the user moves the receiver unit 120 closer to or farther away from the point at which the transmitter unit 110 is located on the opposite side of the wall 190. Accordingly, when the user moves the receiver unit 120 closer to the transmitter unit 110, the volume of the audio at the output 160 increases. The periodic nature of the waveform translated to audio makes it much easier for the human ear to detect than a static, field intensity related signal, such as that which would be generated by a permanent magnet.

When in use, the transmitting solenoid 130 and the receiving solenoid 150 are both typically oriented perpendicular to the wall 190 through which the location is being located. This allows for the receiving solenoid 150 to resonate effectively with the transmitting solenoid 130. The transmitting solenoid 130 is typically located within the transmitter unit 120 such that it comes as close as possible to abutting the wall 190. Similarly, the receiver unit 120 is typically packaged such that when in use, the receiving solenoid 150 may be placed as close as possible to abutting the wall 190 from the opposite side.

In the embodiment, shown, the transmitting solenoid 130 and the receiving solenoid 150 may be selected so as to enhance the transmission of the continuous waveform when the solenoids are close to each other and in alignment and to increase the sharpness of their drop off when taken out of alignment. Accordingly, the transmitting solenoid 130 and receiving solenoid 150 are each paired with resonant capacitors 210, 220 to form LC circuits. In order to bring the coil into resonance at the frequency of the desired continuous waveform, the values for the solenoid transmitter 130 inductance L and the capacitance of the corresponding capacitor 210 are selected to approximate the results of the resonance formula:

$$f_r = \frac{1}{2\pi\sqrt{LC}} \text{Hz}$$

Where $f_r$ is the frequency at which resonance is sought, in this case 5 Hz. The receiving solenoid 150 and capacitor 220 are similarly selected to be in resonance at the desired frequency. By selecting both LC circuits to be in resonance, during use, the strength of the magnetic field generated by the transmitter unit at the location of the receiving circuitry may then be increased by resonance inductive coupling when the transmitting solenoid 130 and the receiving solenoid 150 are substantially axially aligned.

The transmitter solenoid 130 typically has a solid core which may be formed from a high permeability mu metal. In such embodiments, the metal core may have mu>50,000 at 5 HZ, thereby increasing its inductance.

Figure 2:
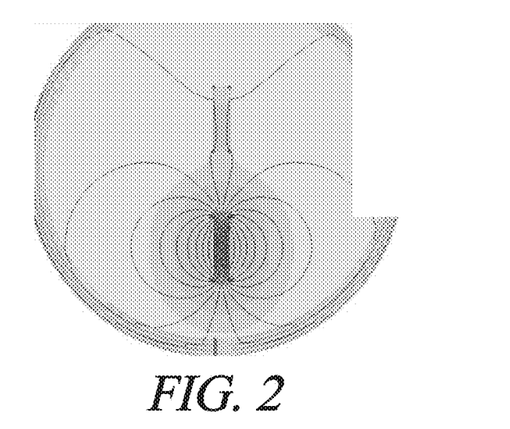
FIG. 2 shows flux coupling between adjacent solenoid coils with flux being transferred from an active solenoid to a passive solenoid.

FIG. 2 shows flux coupling between adjacent solenoid coils 230, 250 with flux being transferred from an active solenoid to a passive solenoid. As shown, even where the transmitter solenoid 230 is active and the receiving solenoid 250 is a passive metal core solenoid, the magnetic fields of the solenoids will couple. In the example shown, the flux density is shown using grayscale, and an increase in flux density in the metal core of the receiving solenoid 150 is generated by the magnetic field of the active transmitter solenoid 130 so long as the solenoids are in or near alignment. This increased flux, visible even in a passive receiving solenoid 150, relative to the surrounding medium (having a permeability of 1 in the image shown), supports transfer of the continuous waveform from the transmitter solenoid 130 to the receiving solenoid 150.

Figure 3A:
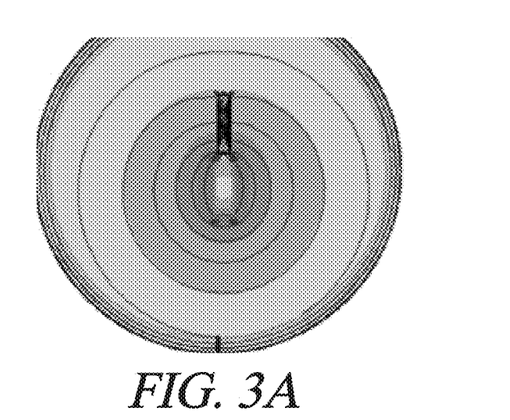
FIG. 3A shows the coupling of transmitting and receiving solenoid coils in the context of the system.
Figure 3B:
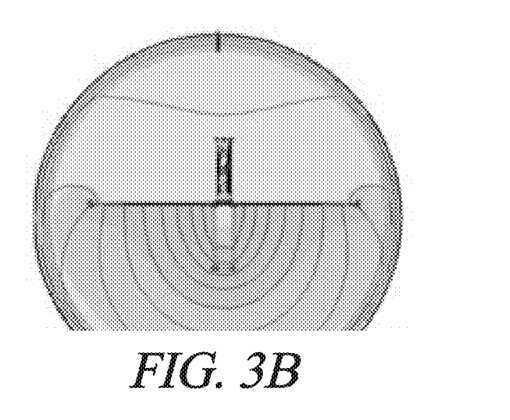
FIG. 3B shows the coupling of FIG. 3A with an intervening wall attenuating flux through the wall.

FIG. 3A shows the coupling of transmitting 130 and receiving 150 solenoid coils in the context of the system 100. FIG. 3B shows the coupling of FIG. 3A with an intervening wall 190 attenuating flux through the wall. As shown, the flux coupling effect, which was visible in the context of the passive receiving solenoid of FIG. 2, is more dramatic in the context of an active receiving solenoid 150.

This flux coupling by way of the magnetic field generated by the transmitter unit 110 allows for the transmission of the continuous waveform as discussed above. As shown in FIG. 3A, when coupled without any intervening wall, the transmitting solenoid 130 and the receiving solenoid 150 fully couple to form a single magnetic field.

As shown in FIG. 3B, when a ferrous metal wall 190 is present, that wall acts as a magnetic shield, concentrating magnet lines of flux within it. This effect reduces the magnetic field detectable on the opposite side of the wall 190. In the configuration discussed above in reference to FIG. 1, the transmitting solenoid 130 acts like a primary winding of a transformer while the receiving solenoid 150, in the receiver unit 120, acts as the secondary winding of the hypothetical transformer.

Because the ferrous metal wall 190 blocks or effectively shunts a significant portion of the magnetic field generated in the transmitting solenoid 130, only a small portion of the original transmitted magnetic field is available to generate a voltage in the receiving solenoid 150. The reduction in field strength, as well as resulting signal strength, due to the ferrous metal wall 190, makes it difficult for a receiver unit 120 to detect magnetic fields produced by the transmitter unit 110, unless the transmitting 130 and receiving 150 solenoids are axially aligned in order to support flux coupling. This results in a dramatic drop off in the strength of the magnetic field when the solenoids 130, 150 are taken out of alignment.

The use of flux coupling to increase the effective magnetic field at the receiver unit 120 results in a signal that is strongest when the transmitter unit 110 and receiver unit 120 are well aligned, and a rapid fall off of signal strength as the transmitting 130 and receiving 150 coils are moved out of alignment. This allows for precise localization of the receiver unit 120, as small displacements from perfect or near perfect alignment will produce very noticeable and dramatic differences in signal strength. In the system 100 of FIG. 1, this results in a quick drop off of the intensity of acoustic signals delivered to the ears of a human operator.

Figure 4A:
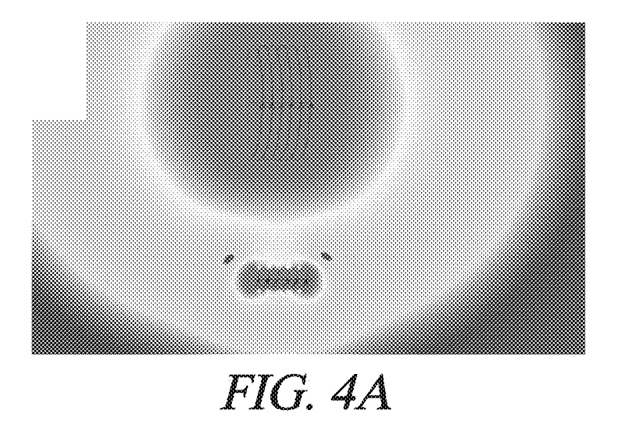
FIG. 4A shows the resulting magnetic flux in solenoid coils having different diameters.

FIG. 4A shows the resulting magnetic flux in solenoid coils 400, 410 having different diameters. As shown, a magnetic field generated by a transmitting coil drops off as a distance from the coil increases. However, that drop off is faster when observed in a cross section perpendicular to an axis of the solenoid than in a cross section parallel to that axis. Accordingly, the gradient shown is much more spread out when viewed axially than when viewed perpendicularly. This results in a relatively sharp magnetic field extending from the lateral ends of the solenoids. The sharpened nature of this field means that the magnetic field will drop off quickly when a receiver unit is not properly aligned with a transmitter unit.

Further, as shown in FIG. 4A, the axially extending magnetic field is sharper when the solenoid 410 has a smaller diameter. This increased fall off of field strength results in increased sensitivity as the diameter of the solenoid decreases. As such, the solenoids used in the transmitter and receiver discussed above may be provided with small diameters.

Figure 4B:
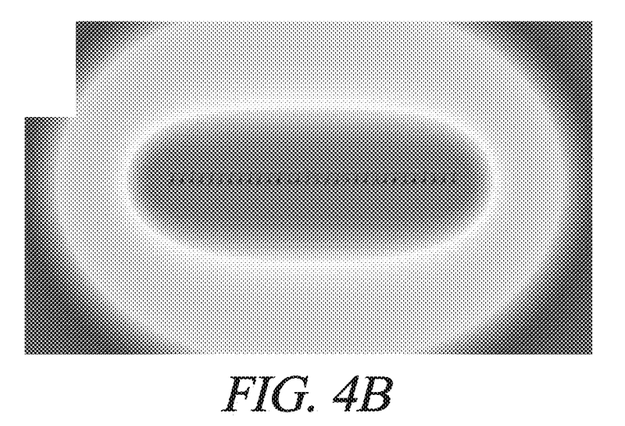
FIG. 4B shows the resulting magnetic flux in coupled solenoid coils when the coils are axially aligned.

FIG. 4B shows the resulting magnetic flux in coupled solenoid coils 400, 410 when the coils are axially aligned. As shown, the increased axial length of the solenoid results in a further sharpened magnetic field at the ends of the coupled solenoids.

Figure 4C:
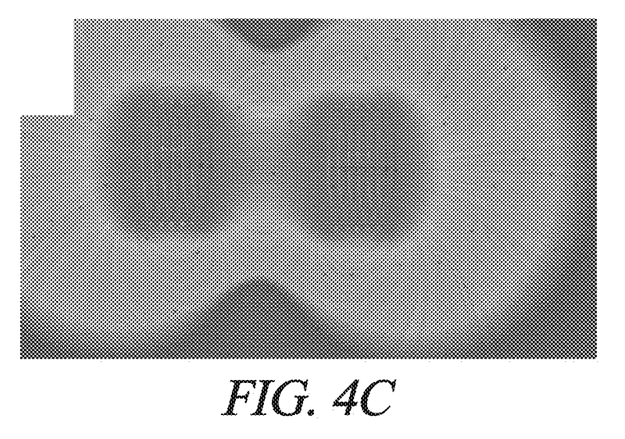
FIG. 4C shows the resulting magnetic flux in coupled solenoid coils when those coils are spaced apart.

FIG. 4C shows the resulting magnetic flux in coupled solenoid coils 420, 430 when those coils are spaced apart. As shown, the increased flux in the receiving coil 430 that results from coupling is retained even when the coils are spaced apart. However, when the coils are moved out of alignment, the magnetic field at the receiving coil 430 is substantially reduced. Further, as shown in FIG. 4C, field strength is greater between the two solenoids 420, 430, due to the flux coupling discussed above, than at the lateral axial ends of the magnetic field. This field strength is at a maximum, regardless of the space between the solenoids 420, 430, when the solenoids are aligned.

As discussed above, in the example of a square wave output at 5 Hz, a user will hear a beating sound that increases and decreases in intensity when the user moves the receiver unit 120 closer to and farther away from the location of the transmitter unit 120 on the opposite side of the wall. When the peak sound is perceived, the user knows that the transmitting 110 and receiver unit 120 are precisely aligned, because inductive coupling of transmitting 130 and receiving solenoids 150 is at a maximum when the solenoids are aligned.

Figure 5A:
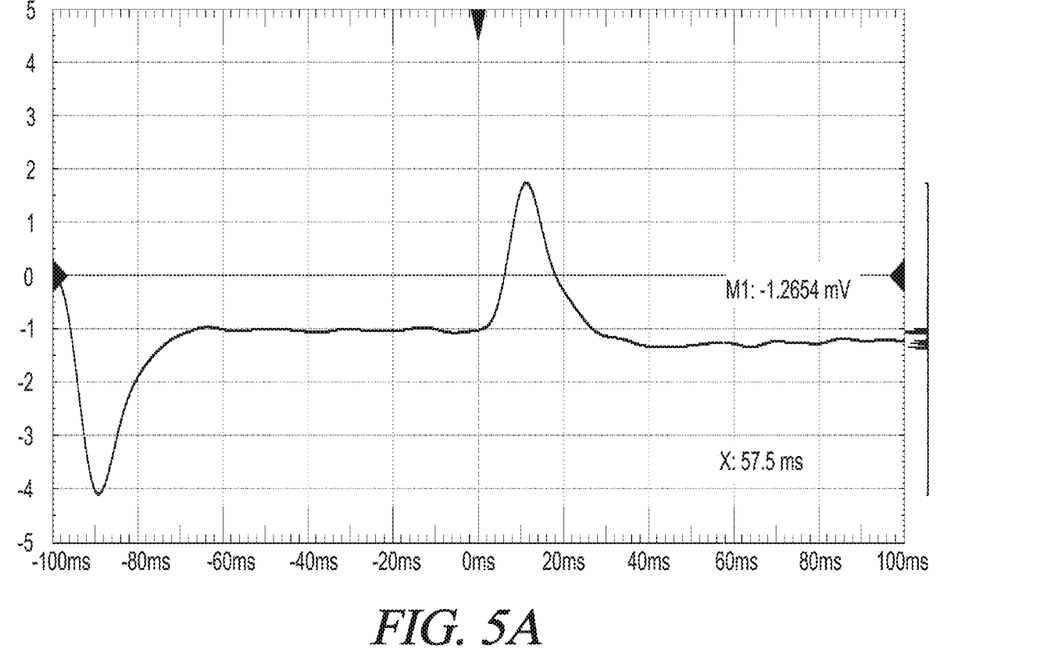
FIG. 5A shows the response to a square pulse at a receiving coil when transmission and receiving coils are misaligned.
Figure 5B:
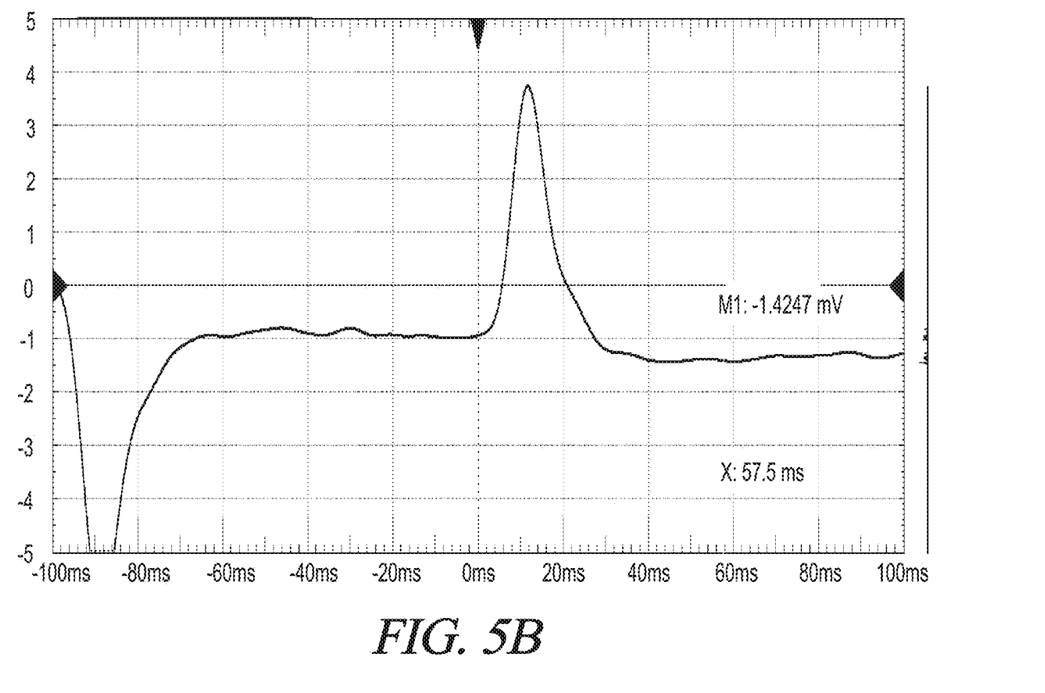
FIG. 5B shows the response to a square pulse at a receiving coil when transmission and receiving coils are aligned.

FIG. 5A shows the response to a square pulse at a receiving coil when transmission and receiving coils are misaligned by approximately two inches. FIG. 5B shows the response to a square pulse at a receiving coil when transmission and receiving coils are aligned. As shown, FIG. 5B, which shows the oscilloscope readout at a receiving coil, shows a response having a higher amplitude than the response shown for the misaligned configuration of FIG. 5A. Further, the slopes of the waveform received in FIG. 5B are steeper than for the misaligned configuration of FIG. 5A.

Accordingly, as shown, as the receiving coil is brought into alignment with the transmitting coil, the volume output at the audio amplifier 160 in the context of the system 100 discussed above is increased significantly. Further, in the case of the square pulse shown, the sound becomes sharper as the coils come into alignment. As such, when the solenoids are aligned, users hear loud, sharp, clicking noises. In contrast, when the solenoids are off axis, the pulse is softer, due to the shallower slope, and the click is also quieter.

It is further noted that magnetic field strength typically falls off at a rate of approximately the cube of the distance from the magnetic source. Therefore, small misalignments will, as shown, result in dramatic fall offs in magnetic field strength, which are then reflected in the output discussed.

Square waves provide a broad spectrum stimulus containing energy at the fundamental and all odd harmonics. This makes it effective for allowing the human ear, which is sensitive to spectral content, to discriminate different positions. Accordingly, clicks having broadband content in the form of a square wave convey more precise location information to the brain than do pure tones.

As such, by providing the continuous waveform in the system 100 in the form of a square pulse, the user can listen to the sound change both in terms of intensity and sharpness.

While the embodiment of FIG. 1 is discussed in the context of a 5 Hz square continuous waveform, additional waveforms are contemplated as well. It is noted the ideal frequency may vary across different materials. Accordingly, 5 Hz may be ideal for most hardened steel materials used in solid metal walls, such as in marine bulkheads. However, ferrous metals may exhibit different efficiencies as transformer cores at different frequencies, which is why allows chosen for transformer cores are selected to have peak response and minimum losses at specific frequencies.

Accordingly, in some embodiments, the frequency of the continuous waveform may be modified or selected on the basis of the particular material through which a point is being located. In such embodiments, the resonating capacitors 210, 220 paired with the solenoids 130, 150 may be adjustable, such that when the frequency is modified, the capacitance of the capacitors are similarly modified so as to maintain the LC circuit of the solenoid and capacitors in resonance at the newly selected frequency.

While the frequency of the continuous waveform may be modified to increase propagation through particular materials, it is further noted that low frequencies, generally in the ultra-low frequency or lower range, and typically below 10 Hz, are more easily heard and discernable as individual sounds by users. Accordingly, the 5 Hz waveform discussed would be heard by a user as a beating sound, while a higher frequency waveform may not be heard at all, or may be heard only as a hum. The lower frequency sound may make it easier to discern changes in characteristics of the sound, such as volume, frequency, sharpness, or pitch, thereby making it easier for a user to determine if they are approaching a local maximum during use of the system 100 described.

Further, while a square waveform has advantages, as discussed above, different waveform shapes are contemplated as well. For example, the waveform may be sawtooth, sinusoidal, or more complex.

Figure 6:
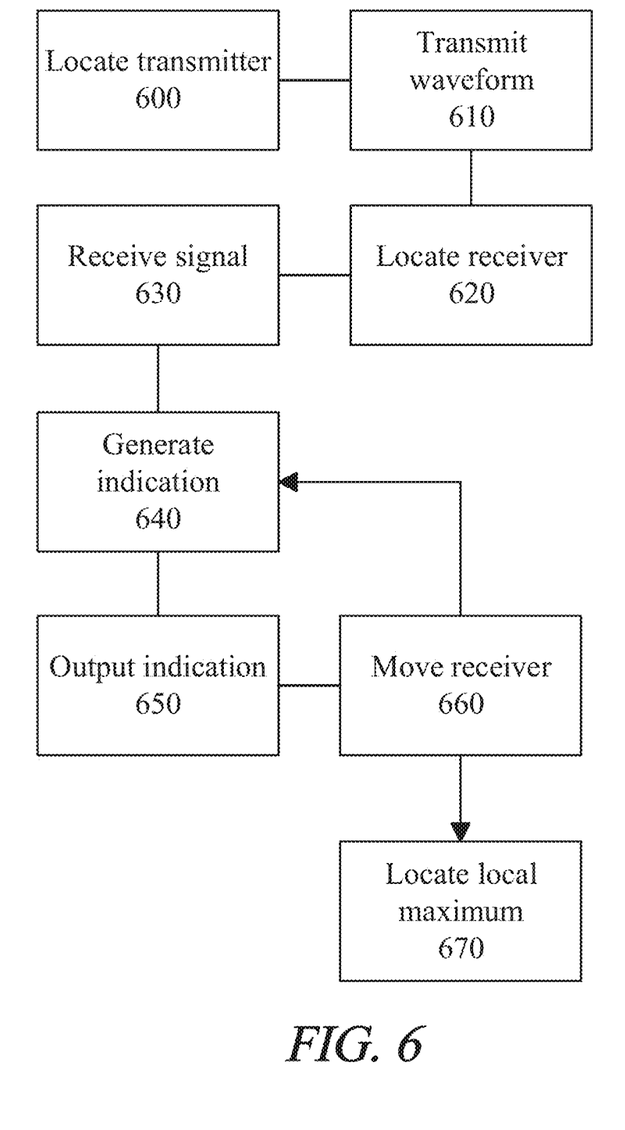
FIG. 6 is a flowchart illustrating a method in accordance with this disclosure.

FIG. 6 is a flowchart illustrating a method for using the system 100 discussed above in accordance with this disclosure. The method may be used for identifying a particular location on a second side of a metal wall 190 corresponding to a desired location on a first side of the wall. The wall 190 may be, for example, a ferrous metal wall. This may be to identify a particular fiducial point for use as a reference, or it may be to identify a location on the wall that is safe for drilling or cutting.

A user of the system 100 initially locates (600) the transmitter unit 110 at a desired location on the first side of the wall 190. This may be by fixing the transmitted unit 110 to the wall by way of a permanent magnet 180 integrated into a housing of the transmitter unit 110.

The user then transmits (610) a continuous electromagnetic waveform from the transmitter unit 110. As discussed above, the continuous electromagnetic waveform may be a square wave transmitted at approximately 5 Hz, and may be transmitted by way of a transmitting solenoid 130 located directly adjacent the wall 190 when the transmitter unit 110 is fixed thereto.

While the continuous electromagnetic waveform is being transmitted by the transmitter unit 110, thereby generating a magnetic field, the user locates (620) the receiver unit 120 adjacent the wall 190 opposite the transmitter unit 110. This initial locating is typically a guess made by the user as to the approximate location of the transmitter unit 110 opposite the wall 190. The receiver unit 120 typically comprises receiving circuitry, such as a receiving solenoid 150, and an output 160, such as an audio amplifier and speaker or earphones for outputting some indication of proximity.

The user then receives (630) at the receiving solenoid 150 of the receiver unit 120, the continuous electromagnetic waveform output by the transmitter unit 110, and generates (640) some indication of proximity based at least partially on the strength of the magnetic field generated by the transmitter unit 110, in the form of the continuous electromagnetic waveform. The indication of proximity is then output (650) to a user by way of the output 160 of the receiver unit 120.

Typically, the output (650) of the indication of proximity would be by way of the audio amplifier and speaker or earphones such that the user can listen to the indication. This may be by directly converting the received continuous electromagnetic waveform to a voltage at the receiving solenoid 150 and converting it directly to audio by way of a pre-amp 200 and/or an audio amplifier at the output 160. This direct conversion would be by amplification proportional to the magnetic field at the receiving solenoid 150, and would thereby increase in intensity, and therefore volume when that field strength increased and decrease in volume when the field strength decreases.

Accordingly, some characteristic of the indication of proximity, in this case audible volume, would be based at least partially on the magnetic field strength at the receiving solenoid. The user would then move (660) the receiver unit 120 along the wall while the receiver unit continuously generates and outputs (640, 650) the indication of proximity to the user.

The user would then continue to move (660) the receiver unit 120 until a local maximum is found (670) for the characteristic of the indication of proximity, in this case volume. Such a local maximum would indicate the location of the transmitter unit 110 opposite the wall 190.

Figure 7:
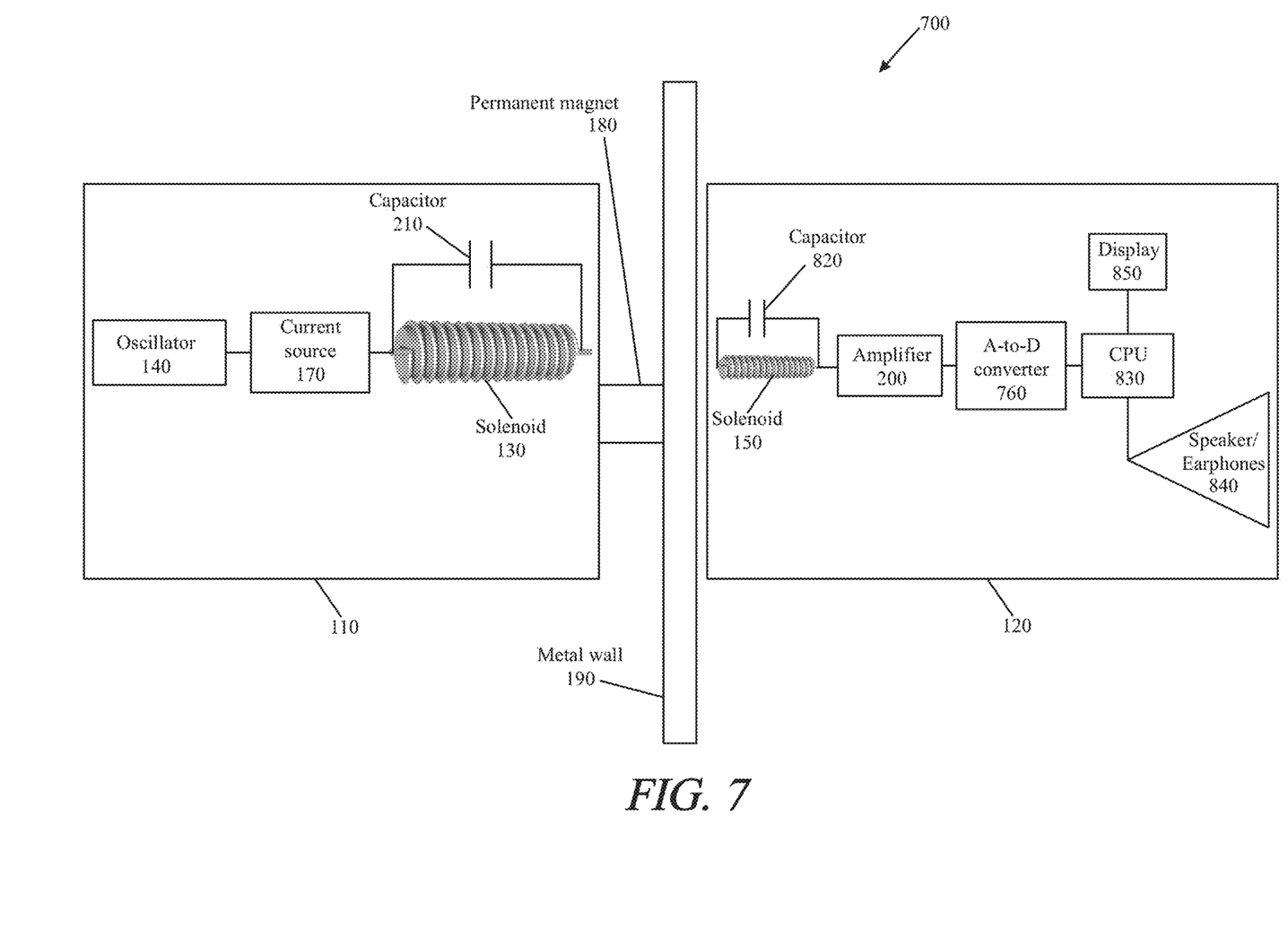
FIG. 7 shows a second embodiment of a system in accordance with this disclosure.

FIG. 7 shows a second embodiment of a system 700 in accordance with this disclosure. The system 700 shown shares many components with the system 100 discussed above with respect to FIG. 1. Therefore, the system 700 generally provides a transmitter unit 710 and a receiver unit 720.

The transmitter unit 710 transmits a continuous waveform as a magnetic field by way of a transmitting solenoid 730, typically paired with a resonance capacitor 810. The transmitter unit 710 may further comprise a harmonic oscillator 740 for generating the continuous waveform and providing it to the transmitting solenoid 730 for transmission by way of a current source or amplifier 770.

The receiver unit 720 may then have receiving circuitry, such as a receiving solenoid 750 paired with a resonating capacitor 820 to receiving the continuous waveform. The receiving solenoid 750 then converts the continuous waveform, received in the form of a magnetic field, into a voltage and provides it to an amplifier 800, such as a pre-amp, which amplifies the voltage from the receiving solenoid 750 in proportion to the strength of the magnetic field.

In the embodiment shown, the output 160 of the system 100 discussed in reference to FIG. 1 is replaced by a digital output comprising an analog to digital converter 760 which feeds the converted signal to processing circuitry 830. The converted signal continues to be proportional to the magnetic field strength at the receiving solenoid 750 and is then may be output as audio at speakers or earphones 840, or may be further processed to display a metric to a user at a digital display 850.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A system for through-wall locating comprising:
a transmitter unit for transmitting a continuous waveform at a frequency below 10 Hz, the continuous waveform being an unmodulated electromagnetic waveform;
a receiver unit for detecting a location of the transmitter unit through a wall, the receiver unit comprising:
receiving circuitry for receiving the continuous waveform; and
an output for outputting an indication of a proximity between the transmitter unit and receiver unit, wherein a characteristic of the indication of the proximity depends on a strength of a magnetic field generated by the transmitter unit a location of the receiving circuitry,
wherein the receiver unit and the transmitter unit are located on opposite sides of the wall through which the location of the transmitter unit is detected,
wherein the transmitter unit comprises a transmitting solenoid for transmitting the continuous waveform, and wherein the receiving circuitry comprises a receiving solenoid for receiving the continuous waveform from the transmitting solenoid, and wherein the receiver unit further comprises an amplifier for amplifying the received continuous waveform from the receiving solenoid in proportion with an intensity of the waveform received at the receiving solenoid,
wherein both the transmitting and the receiving solenoid are oriented perpendicular to the wall through which the transmitter is being located by the receiver unit, and wherein the receiving solenoid is selected to be in resonance with the transmitting solenoid at the frequency of the continuous waveform, and
wherein the strength of the magnetic field generated by the transmitter unit at the location of the receiving circuitry is increased by resonant inductive coupling when the transmitting solenoid and the receiving solenoid are axially aligned.

2. The system of claim 1, wherein the transmitter unit further comprises an oscillator for generating the continuous waveform.

3. The system of claim 2, wherein the continuous waveform is a square waveform.

4. The system of claim 2, wherein the continuous waveform is a sawtooth or sinusoidal waveform.

5. The system of claim 1, wherein the output is an audio amplifier for amplifying the continuous waveform proportionally to the magnetic field strength at the receiving circuitry and outputting the amplified continuous waveform as audio, wherein the characteristic of the indication of the proximity is a volume, frequency, sharpness, or pitch of the audio.

6. The system of claim 5, wherein the continuous waveform is a square waveform and the volume and sharpness of the audio output varies based on location of the receiving circuitry.

7. The system of claim 1, the transmitter unit further comprising a permanent magnet for fixing the transmitter unit to a wall through which the system is being used to locate.

8. A method for through-wall locating, the method comprising:

positioning a transmitter unit adjacent a desired location on a first side of a wall;
transmitting a continuous electromagnetic waveform from the transmitter unit at a frequency below 10 Hz;
positioning a receiver unit for detecting a location of the transmitter unit through the wall adjacent the wall and on an opposite side of the wall from the transmitter unit, the receiver unit comprising receiving circuitry and an output for outputting an indication of proximity between the transmitter unit and the receiver unit;
receiving, at the receiving circuitry of the receiver unit, the continuous electromagnetic waveform output by the transmitter unit;
generating the indication of proximity based at least partially on a strength of a magnetic field generated by the transmitter unit at a location of the receiving circuitry;
continuously outputting the indication of proximity at the output while moving the receiver unit along the wall,
wherein the continuous waveform is transmitted using a transmitting solenoid at the transmitter unit and receiving the continuous electromagnetic waveform using a receiving solenoid at the receiving circuitry and amplifying the signal from the receiving solenoid in proportion with an intensity of the waveform received at the receiving solenoid,
wherein both the transmitting solenoid and the receiving solenoid are oriented perpendicular to the wall through which the location of the transmitter unit is being detected, and wherein the receiving solenoid is selected to be in resonance with the transmitting solenoid at the frequency of the continuous electromagnetic waveform, and
wherein the intensity of the waveform received at the receiving solenoid is increased by resonant inductive coupling when the transmitting solenoid and the receiving solenoid are brought into alignment while moving the receiver unit along the wall.

9. The method of claim 8, wherein the transmitter comprises an oscillator for generating the continuous electromagnetic waveform.

10. The method of claim 9, wherein the continuous electromagnetic waveform is a square waveform.

11. The method of claim 8, wherein the output comprises an audio amplifier for amplifying the continuous waveform proportionally to the magnetic field strength at the receiving circuitry and outputting the amplified continuous waveform as audio, wherein the continuous output of the audio while moving the receiver results in audible changes in the indication of proximity based on a corresponding change in magnetic field strength.

12. The method of claim 11, wherein the indication of the proximity is a volume, frequency, sharpness or pitch of the audio.

13. The method of claim 12 comprising moving the receiver unit along the wall to identify a location along the wall where the volume of the audio is at a local maximum.

14. The method of claim 12, wherein the continuous waveform is a square waveform, the method comprising moving the receiver unit along the wall to identify a location along the wall where the volume of the audio is greatest or the audio pulses are sharpest.

15. The method of claim 8 further comprising fixing the transmitter to the desired location on the first side of the wall by way of a permanent magnet.

* * * * *